UNITED STATES PATENT OFFICE.

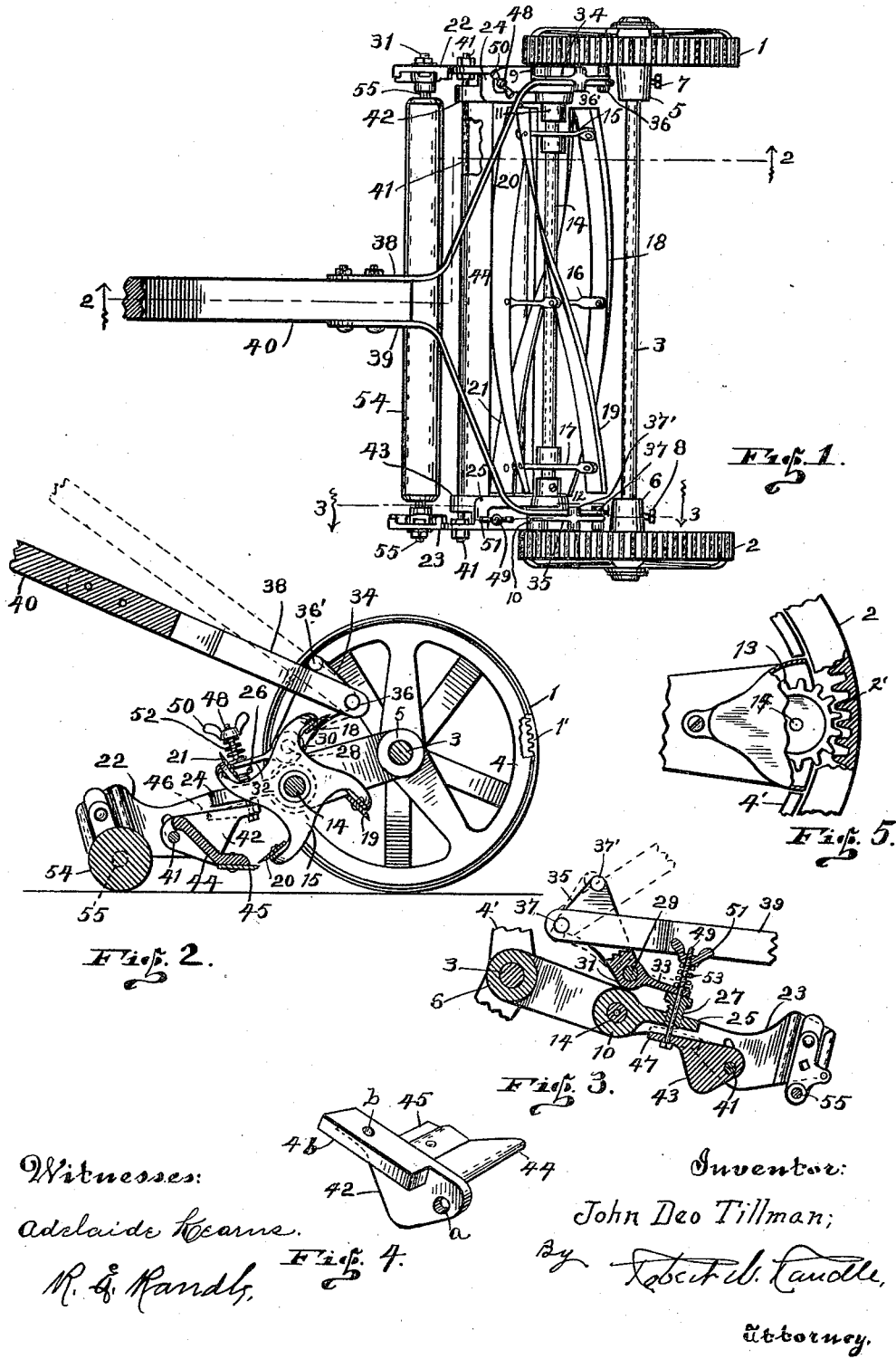

JOHN DEO TILLMAN, OF RICHMOND, INDIANA.

LAWN-MOWER.

1,134,650.  Specification of Letters Patent.  Patented Apr. 6, 1915.

Application filed March 20, 1914. Serial No. 825,980.

*To all whom it may concern:*

Be it known that I, JOHN DEO TILLMAN, a citizen of the United States, residing in the city of Richmond, in the county of Wayne and State of Indiana, have invented certain new and useful Improvements in Lawn-Mowers, of which the following is a full, clear, and accurate specification and exposition, being such as will enable others to make and use the same with exactitude.

The object of my invention, broadly speaking, is to provide certain new and useful improvements in lawn mowers which will greatly improve the utility and the operation of machines of this character, providing a lawn mower which will be strong and durable in construction, positive in action, easily operated and controlled, and which can be manufactured and sold at a comparatively low price.

More specifically stated, my object is to produce a lawn mower wherein the tension of the blade of the cutter-bar is made resilient with relation to the blades of the reel, and means for automatically varying the tension, depending upon the extent of the power applied to propel the machine; also providing means whereby the construction is adapted to automatically allow hard objects to pass between the cutting edges of the blades, in order to minimize the danger which might accrue to the machine.

Other objects and particular advantages of my invention will be brought out in the course of the following specifications.

An example of the means for carrying out my invention in a practical manner is shown in the accompanying drawings, in which—

Figure 1 is a plan view of a lawn mower in which my invention is contained. Fig. 2 is a sectional view, as taken on line 2—2 of Fig. 1, and taken in the direction indicated by the arrows on the said line. Fig. 3 is a detail cross section of the essential features of my invention as taken on the line 3—3 of Fig. 1, and as taken in the direction indicated by the arrows on said line. Fig. 4 is a perspective detail view of one end of the cutter-bar and the parts which are integral therewith. And Fig. 5 is an inside view of a portion of one of the bull-wheels and a disk, showing the same broken away to expose the pinion therein.

Similar indices denote like parts throughout the several views.

In order that the construction and the operation of my invention may be better understood and appreciated I will now take up a detailed description thereof in which I will set forth the invention as briefly and as comprehensively as I may.

Referring now to the drawings in detail: Numerals 1 and 2 designate the two bull-wheels of the machine, the same being spaced apart and connected by the shaft 3 on which they are mounted. The inner peripheries of the bull-wheels are provided with gears 1' and 2', respectively, for the purpose hereinafter stated.

The frame of the machine comprises the two disks 4 and 4', one of which is clearly shown in Fig. 2, which are located inside their respective bull-wheels, with which they are concentric, and each has an inwardly extending hub, 5 and 6 respectively, central thereof, which hubs are secured around the shaft 3 by means of the set-screws 7 and 8.

Extending inward, in an axial direction, from near the periphery of the disks 4 and 4' are the boxings 9 and 10, respectively, in which is located the cones which are denoted by the numerals 11 and 12, and through which is disposed the reel-shaft 14. Secured on each end of the shaft 14 is a pinion, as for instance the pinion 13 shown in Fig. 5. Numeral 14 denotes the reel-shaft which extends through the stems 11 and 12 and the pinion 13 to which it is secured. The reel comprises the shaft 14, the spiders 15, 16 and 17, and the four curved blades 18, 19, 20 and 21. Numerals 22 and 23 denote the two frame-plates. Also extending back from the boxings 9 and 10 and united with the inner faces of the frame-plates 22 and 23, are the respective blocks 24 and 25. Formed through the respective blocks 24 and 25 are the comparatively large, threaded, apertures in each of which is threaded a hollow set-screw, 26 and 27, each having a knurled head on its upper end in order that it may be turned by hand.

Extending inward from the disks 4 and 4', at points above the shaft 14, are the respective pivots 28 and 29. Pivotedly mounted on each of the said pivots is a dog, each comprising a hub, 30 and 31 respectively, a tongue 32 and 33 respectively, and a plate 34 and 35 respectively. Extending inward from the two upper corners of the plate 34 are the pivots 36 and 36', and likewise extending inward from the two upper corners of the plate 35 are the pivots 37 and 37'. Pivoted on the pivot 36 is the handle iron 38, and pivoted on the pivot 37 is the handle iron 39. The said handle irons extend back and then inward toward each other with their rear portions secured to the handle 40, in the usual manner. The upward movements of the said handle irons are limited by the pivots 36' and 37'. The rear portions of the tongues 32 and 33 are adapted to rest on the heads of the respective set-screws 26 and 27, each having an aperture therethrough which registers with the aperture through the respective set screws 26 and 27.

Extending between the plates 34 and 35 are the rod 41, on which are rotatably mounted the end blocks 42 and 43, each having an aperture therethrough, as at $a$ in Fig. 4, through which the rod 41 passes. Integrally connecting the ends 42 and 43 is the cutter-bar 44 which has secured to its front edge the blade 45, with which the blades 18, 19, 20 and 21 are adapted to come into shearing contact.

Extending out from the outer faces of the ends 42 and 43 are the flanges $4^b$ and 47, respectively, through each of which is an aperture, as the aperture $b$ in Fig. 4, which are in alinement with the apertures through the respective set-screws 26 and 27.

Numerals 48 and 49 designate the guide-bolts, each having a hand on its lower end, and having the respective thumb-nuts 50 and 51 threaded on their upper portions. The bolt 48 is disposed up through the flange 46, the set-screw 26, and the tongue 32 with its head contacting with the under side of the flange 46. The bolt 49 is disposed up through the flange 47, the set-screw 27, and the tongue 33, with its head in contact with the under face of the flange 47.

Disposed around the bolt 48, between the nut 50 and the tongue 32 is the coil spring 52; and disposed around the bolt 49, between the nut 51 and the tongue 33, is the coil spring 53. The coil springs 52 and 53 are adapted to resiliently retain the blade 45 up to the limit of its movement for which it may be set. The upward limit of movement of the blade 45 may be varied by means of the set-screws 26 and 27.

Adjustably mounted to the rear portion of the frame plates 22 and 23, and extending therebetween, is the shaft 55 on which is mounted the roller 54, by which the rear of the machine is supported, in order to carry the blade 45 the proper distance above the ground.

*Modus operandi.*—It will now be apparent that if the adjustment be set as in Figs. 2 and 3 that as the reel revolves the blades thereof will barely engage the blade of the cutter-bar. Now if the set-screws 26 and 27 be turned to the right their points will force the blade of the cutter-bar downward, thereby preventing it from moving farther upward but allowing it to be sprung downward away from the blades of the reel and against the resiliency of the springs. On the other hand if the set-screws be turned to the left then the cutter bar blade will rise, by reason of the springs, or allow it to contact more firmly with the blades of the reel, thereby permitting the cutter-bar blade to be adjusted at any height desired, still permitting it to be sprung downward against the resiliency of the springs. The tension, or the degree of tension, by which the cutter-bar blade is held upward may be varied by turning the thumb-nuts 50 and 51 up or down. Now when the desired adjustment of the cutter-bar blade is attained, by means of the set-screws 26 and 27, and the desired tension of the cutter-bar blade is attained by the movements of the thumb nuts 50 and 51, then the machine will be ready for operation, in the usual manner, which will develop other features which I will mention. It will now be noticed that in propelling the machine by pushing upon the handle 40, that a cushioning effect will be attained, its extent being proportioned to the tension of the springs 52 and 53, thereby relieving the operator of sudden jars, particularly when the machine encounters a solid object. Also should the machine encounter tough grass, which will necessitate more power applied to the handle 40, then the tension of the springs 52 and 53 will be automatically increased, thereby pressing the blade 45 more firmly against the blades of the reel and thereby facilitating the cutting of tough grass, and thus the extra tension will be automatically dispensed with when it is not required.

Having now fully shown and described my invention, what I claim and desire to secure by Letter Patent of the United States, is—

1. In a lawn mower comprising a frame carried by bull-wheels and including a pair of disks boxings carried by the outer portions of the disks, a revoluble shaft extending through said boxings, a cutting reel comprising blades carried by said shaft, a pair of frame plates, blocks extending back from the boxings and united with said frame plates, pivots 28 and 29 extending inward from the disks, a dog mounted on each of said pivots, a tongue integral with each dog, a hollow set-screw threaded in each of said blocks and with which said tongues are adapted to engage, a flange extending from each of the end members, a guide bolt extending through each flange and through its respective set-screw, thumb nuts threaded on said bolts, a coil spring disposed around each bolt and pressing against its nut and tongue to retain the blade of the cutter-bar upward to its limit which limit depends upon the position of said nuts, all substantially as shown and described and for the purposes set forth.

2. A lawn mower including a frame supported by bull wheels and including the frame plates located near the inner faces of the bull wheels, a rod extending between said plates, a cutter-bar pivoted on said rod, a blade carried by the cutter-bar, a pair of disks, boxings carried by the outer portions of the disks, a shaft revoluble in said boxings and geared to be revolved by the turning of the bull wheels, blades carried by said shaft and forming a reel, pivots extending inward from the disks and located above their respective boxings, a dog mounted on each of said pivots, a tongue integral with each dog, a block extending back from each boxing, a hollow set-screw threaded in each of said blocks, a flange extending from each of the frame plates, a guide bolt extending through each flange and through its respective set screw and tongue, nuts threaded on said bolts, springs located around each bolt and pressing against its nut and tongue to retain the blade of the cutter bar to its upward limit as determined by the position of said nuts, all substantially as shown and described.

3. In a lawn mower comprising a frame carried by bull-wheels and including a pair of disks, boxings integral with the disks, frame-plates integral with the respective disks and boxings, a reel-shaft extending through said boxings, blades carried by the reel-shaft, means for revolving the reel-shaft, blocks integral with said boxings and frame-plates, a dog pivoted to each of the disks, a tongue extending back from each dog and located above its respective block, a hollow set-screw threaded in each of said blocks with which the tongues are adapted to engage, a cutter-bar pivoted between the disks, a flange located on each end of the cutter-bar and extending under the respective blocks, a guide-bolt extending up through each flange and through its respective set-screw and tongue, thumb nuts on the upper portions of said bolts, a coil spring disposed around each bolt and pressing against its thumb nut and tongue to retain the edge of the cutter-bar upward to its limit depending upon the position of the set-screws, a handle pivoted to the forward ends of the dogs and adapted to change the tension of said springs in order to vary the contact of the blade of the cutter-bar with relation to the blades of the reel depending upon the pressure exerted upon the handle in propelling the mower, all substantially as set forth.

In testimony whereof I have hereunto subscribed my name to this specification in the presence of two subscribing witnesses.

JOHN DEO TILLMAN.

Witnesses:
 ROBT. W. RANDLE,
 R. E. RANDLE.

Copies of this patent may be obtained for five cents each, by addressing the "Commissioner of Patents, Washington, D. C."

It is hereby certified that in Letters Patent No. 1,134,650, granted April 6, 1915, upon the application of John Deo Tillman, of Richmond, Indiana, for an improvement in "Lawn-Mowers," errors appear in the printed specification requiring correction as follows: Page 2, line 33, for the word "hand" read *head;* same page, line 113, after the word "disks" insert a comma; and that the said Letters Patent should be read with these corrections therein that the same may conform to the record of the case in the Patent Office.

Signed and sealed this 11th day of May, A. D., 1915.

[SEAL.]

R. F. WHITEHEAD,
*Acting Commissioner of Patents.*